United States Patent Office 2,747,000
Patented May 22, 1956

2,747,000

SELECTIVE SOLVENT FOR NAPHTHENE HYDROCARBON

William T. Nelson, Bartlesville, Okla., assignor to Phillips Petroleum Company, a corporation of Delaware No Drawing. Application May 25, 1953,
Serial No. 357,345

11 Claims. (Cl. 260—666)

This invention relates to a method for the separation and recovery of naphthalene hydrocarbons from a mixture of hydrocarbons containing naphthenes. In a more specific aspect this invention relates to the removal and recovery of naphthene hydrocarbons from paraffinic hydrocarbons using a selective solvent. In another specific aspect this invention relates to the use of a dialkyl cyanamide as a selective solvent for the separation of naphthene hydrocarbons from mixtures of naphthene and paraffin hydrocarbons.

In the various processes of converting hydrocarbons, there will frequently be formed mixtures which contain some or all types of hydrocarbons such as paraffin, cycloparaffin, olefin, diolefin, and aromatic hydrocarbons. Such mixtures may usually be separated by fractional distillation into fractions consisting essentially of hydrocarbons of the same number of carbon atoms per molecule, but the further separation of such fractions to obtain reasonably pure hydrocarbons is often very difficult by conventional fractionation processes because the hydrocarbons which have the same number of carbon atoms per molecule usually have boiling points which are relatively close together. Various methods have been proposed for effecting the separation of these hydrocarbons. Of these methods, the most practical from the viewpoint of large scale operation are those which involve contacting the mixture of hydrocarbons with a solvent which has a preferential solubility for one or more of the hydrocarbon components.

The use of selective solvents for the separation of organic compounds is well known in the arts. Depending upon the characteristics of the extractive solvent and the organic compounds to be separated, the processes of solvent extraction or extractive distillation can be employed. These processes are useful for obtaining separation of mixtures the components of which have vapor pressures such as to make their separation by conventional fractional distillation difficult if not impossible, or to separate compounds which form azeotropes with each other. This invention is directed particularly to the separation of hydrocarbon mixtures which are difficult to separate by distillation means by employing dimethyl cyanamide for the solvent extraction or the extractive distillation of these fractions.

Solvent extraction operations are defined as those in which the separation of mixtures of different substances is accomplished by treatment in the liquid phase with a selective liquid solvent. In order for a separation to be effected, one or more of the components of the mixture must be more miscible with the solvent than the other components.

If two components are to be separated into substantially pure products, both must be only partly miscible with the solvent, so as to form two liquid phases throughout the contacting column, unless a synthetic reflux is used.

If the component to be extracted is completely miscible with the solvent, it will not be possible to maintain two liquid phases in the extract portion of the column by returning a portion of the extract product as reflux. A synthetic reflux is used in such case of complete miscibility and the refluxing material can be any material having a boiling point different from those of the components of the mixture treated and that of the solvent and which is only partly miscible with the solvent. Suitable hydrocarbons for use as synthetic reflux include n-pentane, isopentane, n-hexane, isohexanes, isooctane, high boiling naphthenes such as dimethyl cyclohexane, ethyl cyclohexane, etc.

The synthetic reflux provides a second liquid phase in the extract portion of the contacting column and displaces the raffinate impurity from the solvent. A synthetic reflux can also be used to obtain two liquid phases in the raffinate portion of the column, as well as in the extract portion, if both components of the feed are completely miscible with the solvent at the operating temperature of the column.

Similarly, if more than two components are present in the feed, the desired extract and raffinate products must each be capable of forming separate liquid phases in the column in the presence of the solvent, and a synthetic reflux may be employed if necessary to cause the formation of separate phases, just as in the case of a two-component feed.

Each of the following objects will be attained by at least one of the aspects of this invention.

It is an object of this invention to provide a method for the separation of naphthenic hydrocarbons from mixtures containing naphthenic hydrocarbons and paraffinic hydrocarbons.

It is another object of this invention to provide a new selective solvent for solvent extraction and extractive distillation processes for separating mixtures of naphthene and paraffin hydrocarbons into their component parts.

It is still another object of this invention to use a dialkyl cyanamide as a selective solvent.

Other objects and advantages of this invention will be apparent to one skilled in the art upon studying the disclosure and the accompanying drawing which forms a part of this disclosure.

The term paraffin as employed in the specification and claims refers to the acyclic paraffins, having the formula $C_nH_{2n+2}$ and the term naphthene refers to the alicyclic paraffins, having the formula $C_nH_{2n}$. These terms are commonly employed in the petroleum and chemical arts to distinguish non-cyclic paraffins from cyclic paraffins.

According to the present invention, naphthene hydrocarbons are selectively separated from paraffin hydrocarbons by treatment with a solvent of dimethyl cyanamide. The process of my invention comprises contacting the naphthene-paraffin hydrocarbon mixture with dimethyl cyanamide in an absorption zone under such conditions of temperature and pressure that the naphthene hydrocarbons are dissolved in the dimethyl cyanamide and may be recovered by subsequent treatment. Ordinarily, atmospheric temperatures will be employed, but reduced temperatures may also be used. Also, the extraction step is ordinarily carried out at pressures greater than atmospheric to assure a liquid phase extraction step, but atmospheric pressures may also be used when the vapor pressure of the mixture at the operating temperature is less than one atmosphere. This extraction process may be carried out in various ways, the most common mode comprising the use of a spray, packed, or bubble plate tower, wherein the hydrocarbon mixture is contacted by the stream of dimethyl cyanamide flowing therethrough, usually in countercurrent relation to the mixture under treatment. If desired, the process may also be carried out by distilling the mixture in the presence of dimethyl cyanamide as an extractive distillation process.

The process of extractive distillation is well known in the art and may be defined as distillation in the presence of a substance which is relatively non-volatile compared to the compounds to be separated and which increases the relative volatility of one of the compounds to be separated. Extractive distillation is described in "Extractive and Azeotropic Distillation" by M. Benedict and L. C. Rubin, Transactions of American Institute of Chemical Engineers, vol. 41 (1945), pages 353 to 370 and "The Selection of 'Separating Agents' for Azeotropic and Extractive Distillation and for Liquid-Liquid Extraction" by A. P. Colburn and E. M. Schoenborn, Transactions of American Institute of Chemical Engineers, vol. 41 (1945), pages 421 to 442.

The solvent of my invention is preferably dimethyl cyanamide and may be used singularly or in admixture with other cyanamides or other liquid materials which have no solvent action. Other dialkyl cyanamides, such as diethyl cyanamide or diisopropyl cyanamide, may also be used provided the temperature of the extraction process is reduced to a point where two phases are obtained or provided a synthetic reflux is used. Dimethyl cyanamide has a molecular weight of 70.09, boiling point of 160° C., vapor pressure of 5 millimeters at 30° C. and melting point of −41.0° C. Diethyl cyanamide has a molecular weight of 98.15, boiling point of 186° C., and melting point of −80.5° C. Diisopropyl cyanamide has a molecular weight of 126.20, boiling point of 207° C., and melting point of −27.3° C. The critical solution temperatures of several hydrocarbons in a 50 volume per cent mixture of hydrocarbon and dimethyl cyanamide are given in Table I.

*Table I*

| Hydrocarbon | Critical Solution Temp., ° F. |
| --- | --- |
| 1-Hexene | 67. |
| Isoprene | 60. |
| Cyclohexane | Estimated 135° F. |
| n-Heptane | Greatly in excess of 130° F. |

The following example illustrates an application of this invention but is not to be construed to limit the invention.

EXAMPLE I

A feed stream comprising a mixture of cyclohexane and n-heptane was contacted with dimethyl cyanamide in a contacting chamber at 80° F. The results of this run are shown in Table II.

*Table II*

| | Feed, Vol. percent | Extract, Vol. percent | Raffinate, Vol. percent | K | $K_R$ |
| --- | --- | --- | --- | --- | --- |
| Cyclohexane | 25.0 | 9.4 | 46.1 | 0.204 | 1.77 |
| n-Heptane | 25.0 | 6.0 | 52.1 | 0.115 | 1.00 |
| Dimethyl Cyanamide | 50.0 | 84.6 | 1.8 | | |
| | 100.0 | 100.0 | 100.0 | | |

The extract phase in this system comprised 58.3 volume per cent of the mixture and the raffinate phase comprised 41.7 volume per cent. K is the ratio of the concentration of the hydrocarbon component in the extract phase to the concentration of the same component in the raffinate phase. $K_R$ is the value of K relative to n-heptane.

A reflux was not used in the run and it is noted that a reflux would increase the amount of cyclohexane in the extract phase.

The temperature in such separation is preferably maintained at from 70 to 120° F.

Reasonable variations and modifications are possible within the scope of the disclosure of the present invention, the essence of which is that dialkyl cyanamides, particularly dimethyl cyanamide, have been found to be excellent selective solvents for the separation of naphthenes from paraffin hydrocarbons.

I claim:

1. A process for the separation of naphthene hydrocarbons and paraffin hydrocarbons which comprises contacting said hydrocarbons with a dialkyl cyanamide wherein each alkyl radical contains no more than 3 carbon atoms, under operating conditions such that two liquid phases exist; and recovering a hydrocarbon product of increased naphthene content.

2. In the separation and recovery of naphthene hydrocarbons from a mixture of hydrocarbons, including paraffinic hydrocarbons and naphthene hydrocarbons, wherein said mixture is contacted with a solvent under conditions such that a liquid phase is produced wherein the ratio of naphthene to paraffin hydrocarbon is increased, the step of contacting said mixture with dimethyl cyanamide as a selective solvent and recovering a hydrocarbon product of increased naphthene content.

3. The process of claim 2 wherein said separation is carried out as a solvent extraction process.

4. The process of claim 2 wherein said separation is carried out as an extractive distillation process.

5. The process of claim 1 wherein the dialkyl cyanamide is dimethyl cyanamide.

6. The process of claim 1 wherein the dialkyl cyanamide is diethyl cyanamide.

7. The process of claim 1 wherein the dialkyl cyanamide is diisopropyl cyanamide.

8. The process of claim 1 wherein the dialkyl cyanamide is methylethyl cyanamide.

9. A process for the separation and recovery of a naphthene hydrocarbon from a mixture of naphthene hydrocarbons and paraffin hydrocarbons having similar boiling points, which comprises contacting said mixture with dimethyl cyanamide under operating conditions such that two liquid phases exist; recovering a solvent phase; and recovering a naphthene hydrocarbon from said solvent phase.

10. A process for the separation and recovery of cyclohexane from a mixture of cyclohexane and n-heptane which comprises contacting said mixture with dimethyl cyanamide at a temperature in the range of 70 to 120° F. and a pressure sufficient to maintain liquid phase; recovering an extract product comprising cyclohexane and dimethyl cyanamide; and recovering cyclohexane from said extract.

11. A continuous, countercurrent, liquid-liquid extraction process for the separation of naphthene hydrocarbons from paraffin hydrocarbons which comprises passing a feed stream comprising said hydrocarbons into a contact zone; passing dimethyl cyanamide into the upper portion of said zone; maintaining two liquid phases in said zone; removing a raffinate phase comprising paraffin hydrocarbons from said zone; removing an extract phase comprising naphthene hydrocarbons and dimethyl cyanamide from said zone; separating said naphthene hydrocarbon from said dimethyl cyanamide and returning a portion of said paraffin hydrocarbon to said zone as reflux.

References Cited in the file of this patent

UNITED STATES PATENTS

| | | |
| --- | --- | --- |
| 2,433,751 | Friedman | Dec. 30, 1947 |
| 2,600,180 | Ardis | June 10, 1952 |

FOREIGN PATENTS

| | | |
| --- | --- | --- |
| 413,307 | Great Britain | July 11, 1934 |